United States Patent
Matheja et al.

(10) Patent No.: US 9,888,316 B2
(45) Date of Patent: Feb. 6, 2018

(54) SYSTEM AND METHOD FOR IDENTIFYING SUBOPTIMAL MICROPHONE PERFORMANCE

(71) Applicants: NUANCE COMMUNICATIONS, INC., Burlington, MA (US); Timo Matheja, Ulm (DE); Markus Buck, Biberach (DE)

(72) Inventors: Timo Matheja, Ulm (DE); Markus Buck, Biberach (DE)

(73) Assignee: Nuance Communications, Inc., Burlington, MA (US)

(*) Notice: Subject to any disclaimer, the term of this patent is extended or adjusted under 35 U.S.C. 154(b) by 22 days.

(21) Appl. No.: 14/778,643

(22) PCT Filed: Mar. 21, 2013

(86) PCT No.: PCT/US2013/033365
§ 371 (c)(1),
(2) Date: Sep. 21, 2015

(87) PCT Pub. No.: WO2014/149050
PCT Pub. Date: Sep. 25, 2014

(65) Prior Publication Data
US 2016/0050488 A1    Feb. 18, 2016

(51) Int. Cl.
*H04R 3/00* (2006.01)
*G06F 3/16* (2006.01)
(Continued)

(52) U.S. Cl.
CPC ............. *H04R 3/00* (2013.01); *G06F 3/165* (2013.01); *H04M 1/6008* (2013.01);
(Continued)

(58) Field of Classification Search
None
See application file for complete search history.

(56) References Cited

U.S. PATENT DOCUMENTS

| | | | | |
|---|---|---|---|---|
| 2002/0048377 A1* | 4/2002 | Vaudrey | ............... | H04R 3/005 381/94.7 |
| 2005/0213778 A1* | 9/2005 | Buck | ................... | H04R 3/005 381/94.3 |

(Continued)

OTHER PUBLICATIONS

Notification Concerning Transmittal of International Preliminary Report on Patentability issued in parent application numbered PCT/US2013/033365 dated Oct. 1, 2015 (6 pages).
(Continued)

*Primary Examiner* — Curtis Kuntz
*Assistant Examiner* — Qin Zhu
(74) *Attorney, Agent, or Firm* — Brian J. Colandreo; Michael T. Abramson; Holland & Knight LLP

(57) ABSTRACT

Embodiments disclosed herein may include determining a signal parameter of a first microphone and a second microphone associated with a computing device. Embodiments may include generating a reference parameter based upon at least one of the parameter of the first microphone and the parameter of the second microphone. Embodiments may include adjusting a tolerance of at least one of the first microphone and the second microphone, based upon the reference parameter. Embodiments may include receiving, at the first microphone, a first speech signal, the first speech signal having a first speech signal magnitude and receiving, at the second microphone, a second speech signal, the second speech signal having a second speech signal magnitude. Embodiments may include comparing at least one of the first speech signal magnitude and the second speech signal magnitude with a third speech signal magnitude and detecting an obstructed microphone based upon the comparison.

17 Claims, 12 Drawing Sheets

(51) Int. Cl.
*H04M 1/60* (2006.01)
*H04M 1/03* (2006.01)

(52) U.S. Cl.
CPC ............... *H04R 3/005* (2013.01); *H04M 1/03* (2013.01); *H04R 2430/03* (2013.01); *H04R 2430/23* (2013.01); *H04R 2499/11* (2013.01)

(56) References Cited

U.S. PATENT DOCUMENTS

| | | | |
|---|---|---|---|
| 2005/0239516 A1* | 10/2005 | Gonopolskiy | H04M 1/03 455/570 |
| 2005/0249359 A1* | 11/2005 | Roeck | H04R 3/005 381/92 |
| 2006/0222184 A1* | 10/2006 | Buck | G10L 21/0208 381/71.1 |
| 2007/0021958 A1* | 1/2007 | Visser | G10L 21/0272 704/226 |
| 2009/0196429 A1 | 8/2009 | Ramakrishnan et al. | |
| 2009/0238377 A1* | 9/2009 | Ramakrishnan | G10L 21/028 381/92 |
| 2009/0296946 A1 | 12/2009 | Zhang | |
| 2010/0195838 A1* | 8/2010 | Bright | H04M 1/03 381/57 |
| 2011/0038486 A1 | 2/2011 | Beaucoup | |
| 2011/0044461 A1* | 2/2011 | Kuech | H04M 9/082 381/66 |
| 2011/0144984 A1* | 6/2011 | Konchitsky | H04R 1/406 704/226 |
| 2011/0317848 A1 | 12/2011 | Ivanov et al. | |
| 2012/0082322 A1* | 4/2012 | van Waterschoot | G10L 21/0316 381/92 |
| 2012/0128175 A1 | 5/2012 | Visser et al. | |
| 2012/0310640 A1 | 12/2012 | Kwatra et al. | |
| 2013/0039503 A1* | 2/2013 | Beaucoup | H04M 9/082 381/66 |
| 2013/0223660 A1* | 8/2013 | Olafsson | H04R 25/407 381/313 |

OTHER PUBLICATIONS

International Search Report issued in parent application numbered PCT/US2013/033365 dated Jun. 17, 2013.
Supplementary European Search Report issued in related application numbered EP 13 878 579.5 dated Oct. 13, 2016 (10 pages).

* cited by examiner

300

500

502 — determining a parameter of a first microphone and a second microphone, wherein the first microphone and the second microphone are associated with a computing device 504 — generating a reference parameter based upon, at least in part, at least one of the parameter of the first microphone and the parameter of the second microphone 506 — adjusting a tolerance of at least one of the first microphone and the second microphone, based upon, at least in part, the reference parameter 508 — receiving, at the first microphone, a first speech signal corresponding to an utterance of a speaker, the first speech signal having a first speech signal magnitude 510 — receiving, at the second microphone, a second speech signal corresponding to the utterance of the speaker, the second speech signal having a second speech signal magnitude 512 — comparing at least one of the first speech signal magnitude and the second speech signal magnitude with a third speech signal magnitude 514 — detecting an obstructed microphone based upon, at least in part, the comparison

FIG. 5

SYSTEM AND METHOD FOR IDENTIFYING SUBOPTIMAL MICROPHONE PERFORMANCE

RELATED APPLICATIONS

The subject application is a U.S. National Stage Application of International Application No. PCT/US2013/033365, filed on Mar. 21, 2013, the contents of which are herein incorporated by reference in its entirety.

TECHNICAL FIELD

This disclosure relates to signal processing systems and, more particularly, to a method for identifying one or more obstructed microphones associated with the signal processing system.

BACKGROUND

Microphones used in signal processing systems often have non-uniform characteristics. For example, the microphones in a hands-free voice command or communication system in an automobile may detect the same speech signal, but nonetheless produce very different microphone output signals. Non-uniform microphone characteristics may result from variations in the microphone fabrication process, from changes arising in the microphones from age, use, temperature, humidity, altitude, or from other factors. Non-uniform microphone characteristics may result in non-uniform frequency response between microphones, reduced signal strength and sampling accuracy, inconsistent sampling of sound signals, and generally reduced system performance. Occasionally, a non-uniform microphone characteristic may occur as a result of an obstructed microphone (e.g. user blocking the microphone with his/her hand, etc.).

SUMMARY OF DISCLOSURE

In one implementation, a method, in accordance with this disclosure, may include determining a parameter of a first microphone and a second microphone, wherein the first microphone and the second microphone are associated with a computing device. The method may further include generating a reference parameter based upon, at least in part, at least one of the parameter of the first microphone and the parameter of the second microphone. The method may also include adjusting a tolerance of at least one of the first microphone and the second microphone, based upon, at least in part, the reference parameter. The method may further include receiving, at the first microphone, a first speech signal corresponding to an utterance of a speaker, the first speech signal having a first speech signal magnitude. The method may additionally include receiving, at the second microphone, a second speech signal corresponding to the utterance of the speaker, the second speech signal having a second speech signal magnitude. The method may also include comparing at least one of the first speech signal magnitude and the second speech signal magnitude with a third speech signal magnitude and detecting an obstructed microphone based upon, at least in part, the comparison.

One or more of the following features may be included. In some embodiments, detecting the obstructed microphone may include identifying at least one low-pass characteristic associated with the obstructed microphone. The method may further include deactivating the obstructed microphone. In some embodiments, in response to detecting the obstructed microphone, the method may include deactivating a beamforming setting associated with the computing device. The method may further include identifying a microphone channel based upon, at least in part, a signal-to-noise ratio analysis. The method may also include generating, at the computing device, a feedback signal configured to indicate the presence of the obstructed microphone. In some embodiments, the third speech signal magnitude is at least one of the first speech signal magnitude, second speech signal magnitude, a median of a plurality of speech magnitudes, and a reference speech signal magnitude.

In another implementation, a system is provided. The system may include a computing device including one or more processors configured to determine a parameter of a first microphone and a second microphone, wherein the first microphone and the second microphone are associated with the computing device. The one or more processors may be further configured to generate a reference parameter based upon, at least in part, at least one of the parameter of the first microphone and the signal parameter of the second microphone. The one or more processors may be further configured to adjust a tolerance of at least one of the first microphone and the second microphone, based upon, at least in part, the reference parameter. The one or more processors may be further configured to receive, at the first microphone, a first speech signal corresponding to an utterance of a speaker, the first speech signal having a first speech signal magnitude. The one or more processors may be further configured to receive, at the second microphone, a second speech signal corresponding to the utterance of the speaker, the second speech signal having a second speech signal magnitude. The one or more processors may be further configured to compare at least one of the first speech signal magnitude and the second speech signal magnitude with a third speech signal magnitude. The one or more processors may be further configured to detect an obstructed microphone based upon, at least in part, the comparison.

One or more of the following features may be included. In some embodiments, detecting the obstructed microphone may include identifying at least one low-pass characteristic associated with the obstructed microphone. The one or more processors may be further configured to deactivate the obstructed microphone. In some embodiments, in response to detecting the obstructed microphone, the one or more processors may be further configured to deactivate a beamforming setting associated with the computing device. In some embodiments, the one or more processors may be further configured to identify a microphone channel based upon, at least in part, a signal-to-noise ratio analysis. In some embodiments, the one or more processors may be further configured to generate at the computing device, a feedback signal configured to indicate the presence of the obstructed microphone. In some embodiments, the third speech signal magnitude is at least one of the first speech signal magnitude, second speech signal magnitude, a median of a plurality of speech magnitudes, and a reference speech signal magnitude.

In another implementation, a computer program product is provided. The computer program product may include a non-transitory computer readable medium having stored thereon instructions, which when executed result in one or more operations. Operations may include determining a parameter of a first microphone and a second microphone, wherein the first microphone and the second microphone are associated with a computing device. Operations may further include generating a reference parameter based upon, at least in part, at least one of the parameter of the first microphone and the frequency response of the second microphone. Operations may also include adjusting a tolerance of at least one of the first microphone and the second microphone, based upon, at least in part, the reference parameter. Operations may further include receiving, at the first microphone, a first speech signal corresponding to an utterance of a speaker, the first speech signal having a first speech signal magnitude. Operations may additionally include receiving, at the second microphone, a second speech signal corresponding to the utterance of the speaker, the second speech signal having a second speech signal magnitude. Operations may also include comparing at least one of the first speech signal magnitude and the second speech signal magnitude with a third speech signal magnitude and detecting an obstructed microphone based upon, at least in part, the comparison.

One or more of the following features may be included. In some embodiments, detecting the obstructed microphone may include identifying at least one low-pass characteristic associated with the obstructed microphone. Operations may further include deactivating the obstructed microphone. In some embodiments, in response to detecting the obstructed microphone, operations may include deactivating a beamforming setting associated with the computing device. Operations may further include identifying a microphone channel based upon, at least in part, a signal-to-noise ratio analysis. Operations may also include generating, at the computing device, a feedback signal configured to indicate the presence of the obstructed microphone. In some embodiments, the third speech signal magnitude may be at least one of the first speech signal magnitude, second speech signal magnitude, a median of a plurality of speech magnitudes, and a reference speech signal magnitude.

The details of one or more implementations are set forth in the accompanying drawings and the description below. Other features and advantages will become apparent from the description, the drawings, and the claims.

BRIEF DESCRIPTION OF THE DRAWINGS

FIG. 5 is a flowchart of a microphone identification process in accordance with an embodiment of the present disclosure;

Like reference symbols in the various drawings may indicate like elements.

DETAILED DESCRIPTION OF THE EMBODIMENTS

Embodiments provided herein are directed towards a microphone identification process 10 configured to detect an obstructed microphone in a multi-channel speech enhancement system. In the case of multi-channel speech enhancement a beamforming approach is commonly used. Here, the system may produce a poor output signal or fail completely if a microphone is covered, e.g., by the hand of the user. As expected, this risk increases at small hand-held devices like tablet-computers or mobile phones. If a covered microphone is detected the signal processing may be adjusted to achieve an enhanced output signal also in these critical situations.

In this way, if one microphone within a beamforming system is covered, e.g., by the hand of a user, the spatial filtering may not work correctly anymore and the output signal is not enhanced but rather impaired. This may be particularly true for adaptive beamforming as signal cancellation may occur and the desired speech signal is strongly attenuated.

Figure 1:
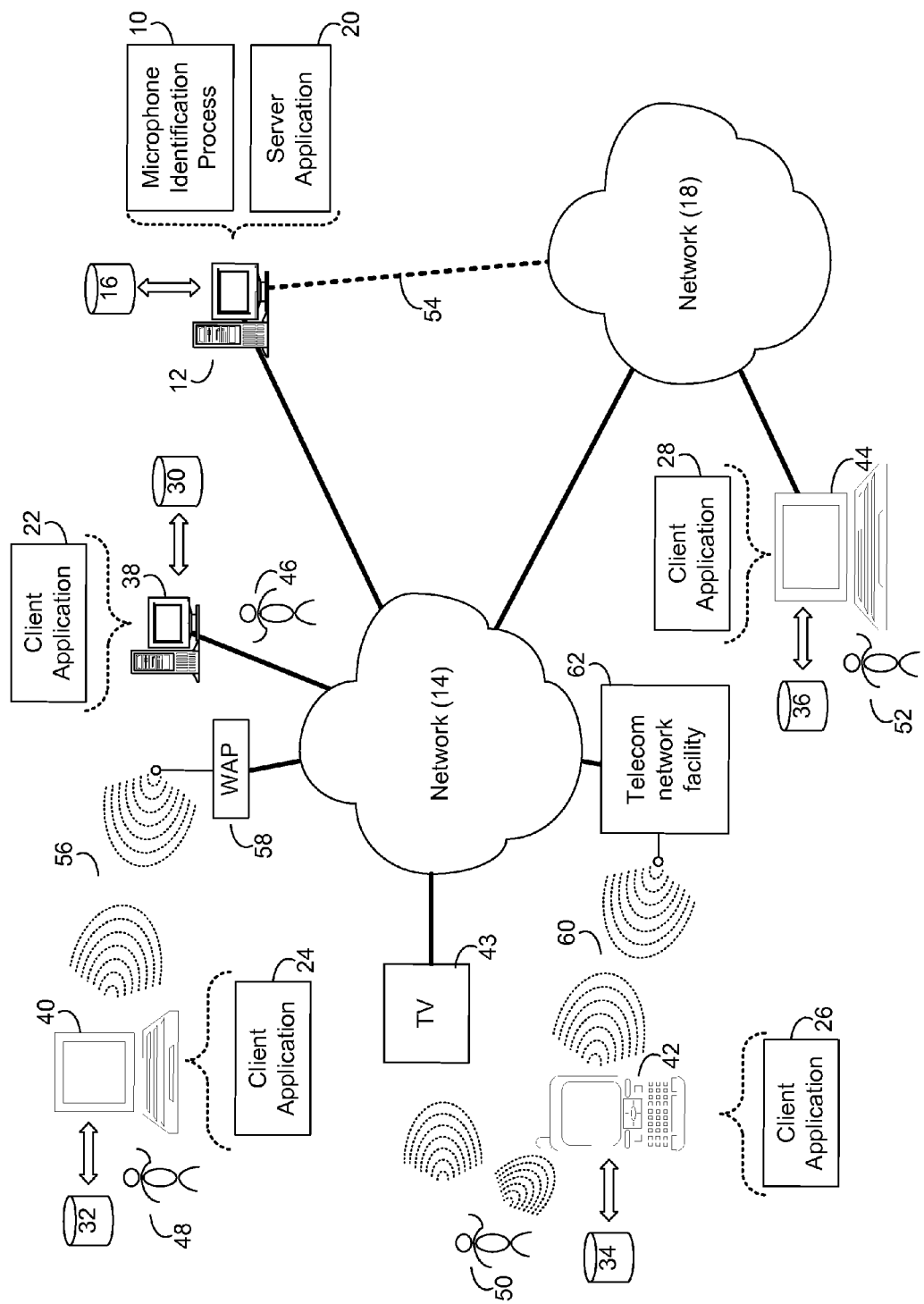
FIG. 1 is a diagrammatic view of a microphone identification process in accordance with an embodiment of the present disclosure.

Referring to FIG. 1, there is shown a microphone identification process 10 that may reside on and may be executed by computer 12, which may be connected to network 14 (e.g., the Internet or a local area network). Server application 20 may include some or all of the elements of microphone identification process 10 described herein. Examples of computer 12 may include but are not limited to a single server computer, a series of server computers, a single personal computer, a series of personal computers, a mini computer, a mainframe computer, an electronic mail server, a social network server, a text message server, a photo server, a multiprocessor computer, one or more virtual machines running on a computing cloud, and/or a distributed system. The various components of computer 12 may execute one or more operating systems, examples of which may include but are not limited to: Microsoft Windows Server™; Novell Netware™; Redhat Linux™, Unix, or a custom operating system, for example.

As will be discussed below in greater detail in FIGS. 2-9, microphone identification process 10 may include determining (502) a parameter of a first microphone and a second microphone, wherein the first microphone and the second microphone are associated with a computing device. The method may further include generating (504) a reference parameter based upon, at least in part, at least one of the parameter of the first microphone and the parameter of the second microphone. The method may also include adjusting (506) a tolerance of at least one of the first microphone and the second microphone, based upon, at least in part, the reference parameter. The method may further include receiving (508), at the first microphone, a first speech signal corresponding to an utterance of a speaker, the first speech signal having a first speech signal magnitude. The method may additionally include receiving (510), at the second microphone, a second speech signal corresponding to the utterance of the speaker, the second speech signal having a second speech signal magnitude. The method may also include comparing (512) at least one of the first speech signal magnitude and the second speech signal magnitude with a third speech signal magnitude and detecting (514) an obstructed microphone based upon, at least in part, the comparison. It should be noted that any reference to two microphones, included herein, is provided merely by way of example, as the teachings of the present disclosure may used in accordance with any number of microphones.

The instruction sets and subroutines of microphone identification process 10, which may be stored on storage device 16 coupled to computer 12, may be executed by one or more processors (not shown) and one or more memory architectures (not shown) included within computer 12. Storage device 16 may include but is not limited to: a hard disk drive; a flash drive, a tape drive; an optical drive; a RAID array; a random access memory (RAM); and a read-only memory (ROM).

Network 14 may be connected to one or more secondary networks (e.g., network 18), examples of which may include but are not limited to: a local area network; a wide area network; or an intranet, for example.

In some embodiments, microphone identification process 10 may reside in whole or in part on one or more client devices and, as such, may be accessed and/or activated via client applications 22, 24, 26, 28. Examples of client applications 22, 24, 26, 28 may include but are not limited to a standard web browser, a customized web browser, or a custom application that can display data to a user. The instruction sets and subroutines of client applications 22, 24, 26, 28, which may be stored on storage devices 30, 32, 34, 36 (respectively) coupled to client electronic devices 38, 40, 42, 44 (respectively), may be executed by one or more processors (not shown) and one or more memory architectures (not shown) incorporated into client electronic devices 38, 40, 42, 44 (respectively).

Storage devices 30, 32, 34, 36 may include but are not limited to: hard disk drives; flash drives, tape drives; optical drives; RAID arrays; random access memories (RAM); and read-only memories (ROM). Examples of client electronic devices 38, 40, 42, 44 may include, but are not limited to, personal computer 38, laptop computer 40, smart phone 42, television 43, notebook computer 44, a server (not shown), a data-enabled, cellular telephone (not shown), and a dedicated network device (not shown).

One or more of client applications 22, 24, 26, 28 may be configured to effectuate some or all of the functionality of microphone identification process 10. Accordingly, microphone identification process 10 may be a purely server-side application, a purely client-side application, or a hybrid server-side/client-side application that is cooperatively executed by one or more of client applications 22, 24, 26, 28 and microphone identification process 10.

Client electronic devices 38, 40, 42, 44 may each execute an operating system, examples of which may include but are not limited to Apple iOS™, Microsoft Windows™, Android™, Redhat Linux™, or a custom operating system.

Users 46, 48, 50, 52 may access computer 12 and microphone identification process 10 directly through network 14 or through secondary network 18. Further, computer 12 may be connected to network 14 through secondary network 18, as illustrated with phantom link line 54. In some embodiments, users may access microphone identification process 10 through one or more telecommunications network facilities 62.

The various client electronic devices may be directly or indirectly coupled to network 14 (or network 18). For example, personal computer 38 is shown directly coupled to network 14 via a hardwired network connection. Further, notebook computer 44 is shown directly coupled to network 18 via a hardwired network connection. Laptop computer 40 is shown wirelessly coupled to network 14 via wireless communication channel 56 established between laptop computer 40 and wireless access point (i.e., WAP) 58, which is shown directly coupled to network 14. WAP 58 may be, for example, an IEEE 802.11a, 802.11b, 802.11g, Wi-Fi, and/or Bluetooth device that is capable of establishing wireless communication channel 56 between laptop computer 40 and WAP 58. All of the IEEE 802.11x specifications may use Ethernet protocol and carrier sense multiple access with collision avoidance (i.e., CSMA/CA) for path sharing. The various 802.11x specifications may use phase-shift keying (i.e., PSK) modulation or complementary code keying (i.e., CCK) modulation, for example. Bluetooth is a telecommunications industry specification that allows e.g., mobile phones, computers, and smart phones to be interconnected using a short-range wireless connection.

Smart phone 42 is shown wirelessly coupled to network 14 via wireless communication channel 60 established between smart phone 42 and telecommunications network facility 62, which is shown directly coupled to network 14.

As shown in FIG. 1, in some embodiments microphone identification process 10 may be a client-side application, which may reside upon a mobile electronic device such as smartphone 42. This particular type of arrangement is discussed in further detail with reference to FIGS. 2-3, which are discussed in further detail below.

Figure 2:
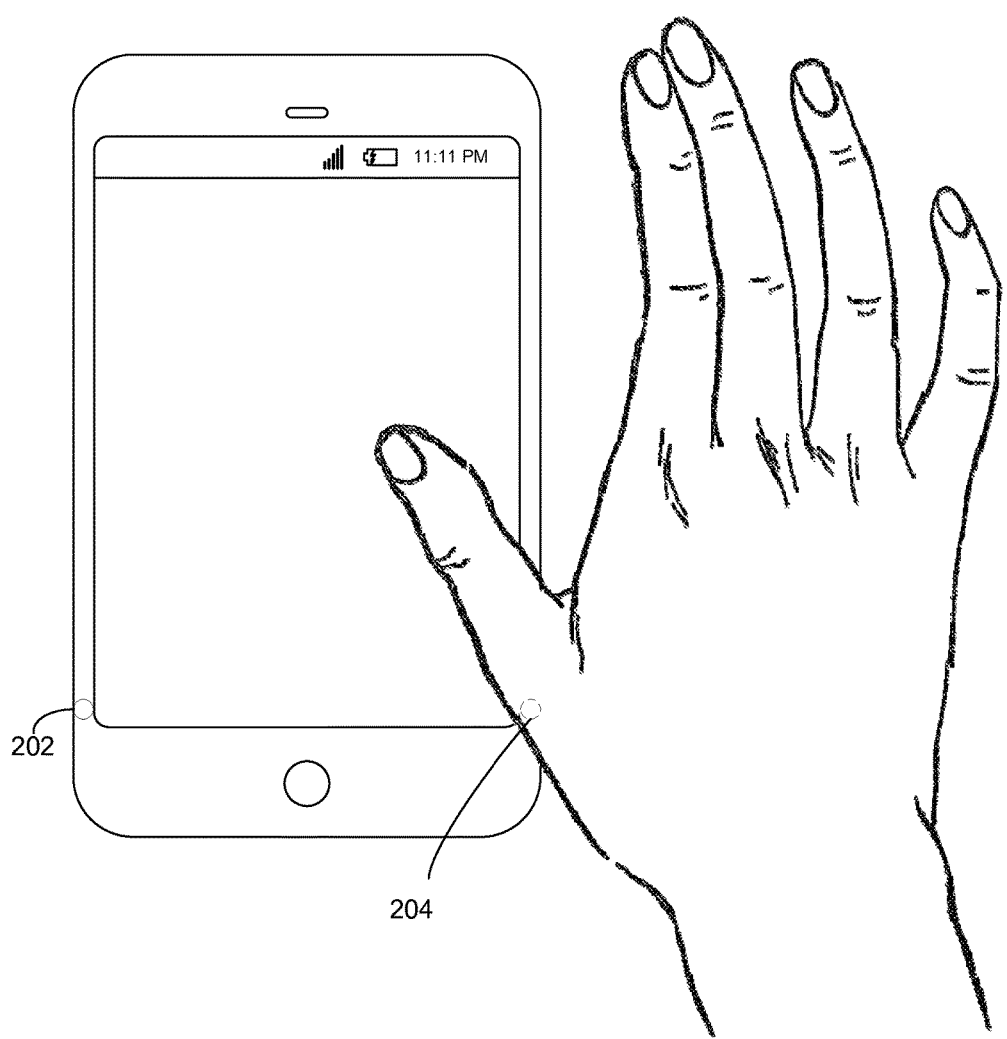
FIG. 2 is a diagrammatic view of a system configured to implement a microphone identification process in accordance with an embodiment of the present disclosure.

Referring now to FIG. 2, an embodiment of microphone identification process 10, which may be used in conjunction with a mobile electronic device 200 is provided. In this particular embodiment, mobile electronic device 200 may include one or more microphones that may be configured to receive a speech signal (e.g. an utterance of a user). In this particular example, the hand of the user (e.g. user 50) may be blocking one of the one or more microphones associated with mobile electronic device 200. Accordingly, microphone identification process 10 may be configured to identify instances where a microphone is obstructed and may also be configured to identify the precise microphone within a particular array that is obstructed. As shown in FIG. 2, microphone 202 is unobstructed and microphone 204 is obstructed by the user's hand.

Figure 3:
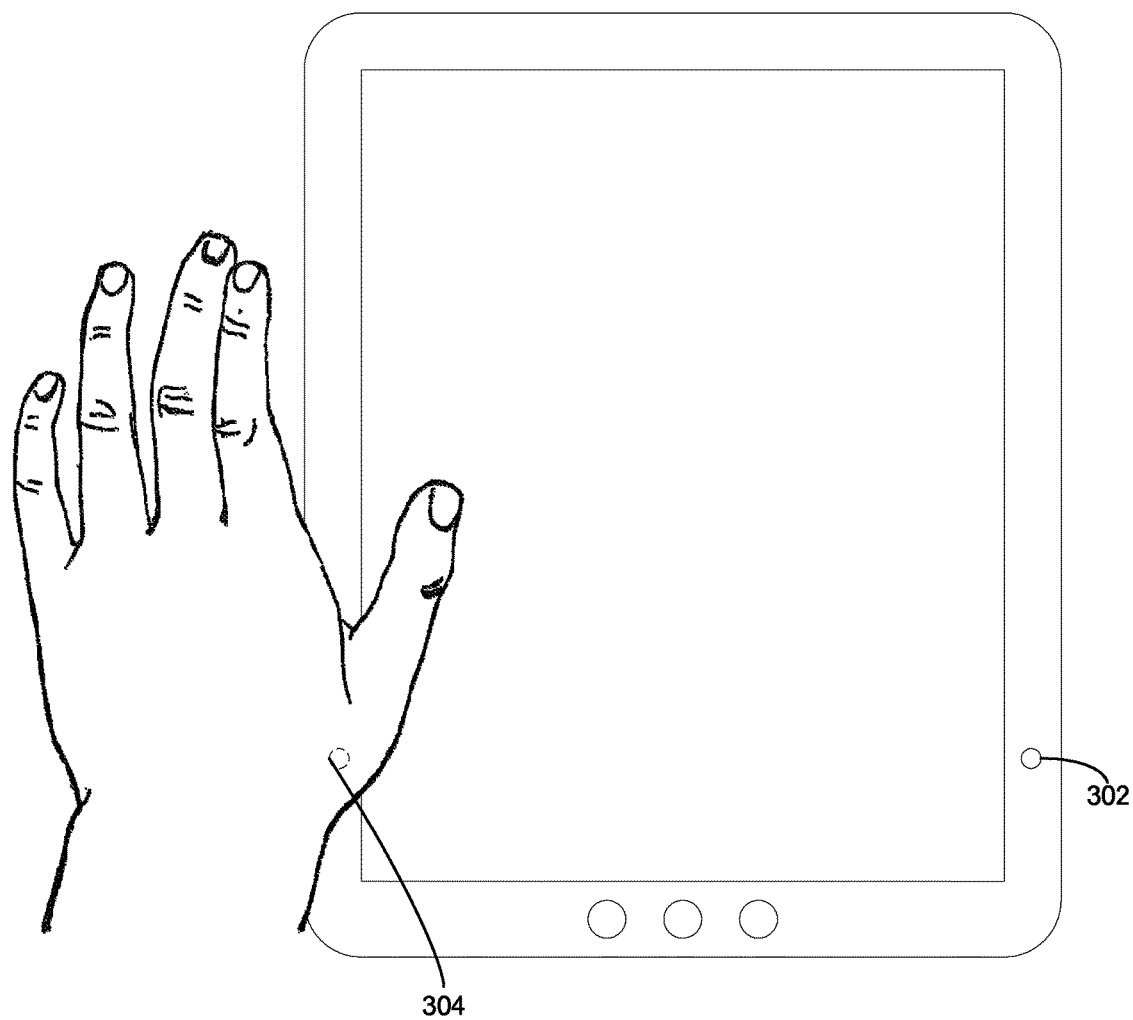
FIG. 3 is a diagrammatic view of a system configured to implement a microphone identification process in accordance with an embodiment of the present disclosure.

Referring now to FIG. 3, another embodiment of microphone identification process 10, which may be used in conjunction with a mobile electronic device 300 is provided. The configuration shown in FIG. 3 depicts a tablet computing device. In this particular embodiment, microphone 302 is shown unobstructed while microphone 304 is obstructed. It should be noted that these Figures are provided merely by way of example, as the type of electronic device as well as the positioning and number of microphones used in accordance with the teachings of the present disclosure are not intended to be limited to those shown in the Figures.

Figure 4:
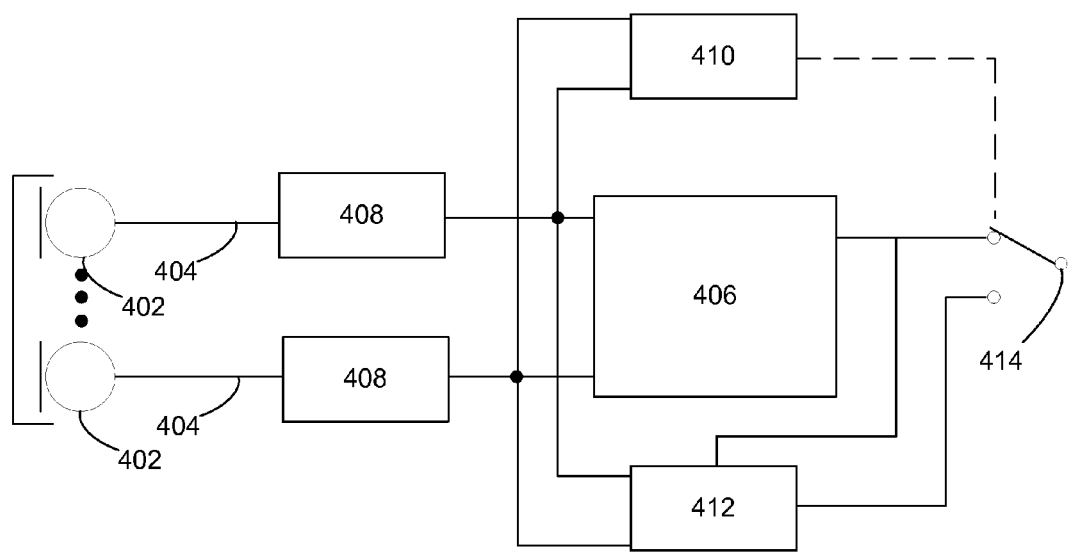
FIG. 4 is a diagrammatic view of a system configured to implement a microphone identification process in accordance with an embodiment of the present disclosure.

Referring now to FIG. 4, an embodiment of a system, which may be used in accordance with microphone identification process 10 is depicted. For example, in some embodiments, this system may be included within mobile electronic devices 300 and/or 400 shown in FIGS. 2-3. FIG. 4 depicts a microphone array 400 having at least two microphones 402. While a particular arrangement of the microphones 402 in the microphone array 400 is shown, different arrangements of microphones 402 are possible without departing from the scope of the present disclosure. For example, microphones 402 may be placed in a row, where each microphone 402 has a predetermined distance to its neighbors. Depending on the application, microphone array 400 may be mounted at a suitable place such as within mobile electronic devices 300 and/or 400. Additionally and/or alternatively, in the case of a vehicle or a vehicle cabin, the microphone array 400 may be mounted in the driving mirror near the roof of the vehicle, or in the headrest. In this application, the term vehicle may include, but is not limited to, an automobile, motorcycle, spaceship, airplane and/or train, or any other means of conventional or unconventional transportation.

In some embodiments, microphone signals 404 emanating from the microphones 402 may be sent to beamformer 406. Beamforming, as used herein, may generally refer to a signal processing technique used in sensor arrays for directional signal transmission or reception. Beamforming methods may be used for background noise reduction, particularly in the field of vehicular handsfree systems, but also in other applications. A beamformer such as beamformer 406, may be configured to process signals emanating from a microphone array to obtain a combined signal in such a way that signal components coming from a direction different from a predetermined wanted signal direction are suppressed. Microphone arrays (e.g. array 400 shown in FIG. 4), unlike conventional directional microphones, may be electronically steerable which gives them the ability to acquire a high-quality signal or signals from a desired direction or directions while attenuating off-axis noise or interference. It should be noted that the discussion of beamforming is provided merely by way of example as the teachings of the present disclosure may be used with any suitable signal processing method.

Beamforming, therefore, may provide a specific directivity pattern for a microphone array. In the case of, for example, delay-and-sum beamforming (DSBF), beamforming encompasses delay compensation and summing of the signals. Due to spatial filtering obtained by a microphone array with a corresponding beamformer, it is often possible to improve the signal to noise ratio ("SNR"). However, achieving a significant improvement in SNR with simple DSBF requires an impractical number of microphones, even under idealized noise conditions. Another beamformer type is the adaptive beamformer. Traditional adaptive beamformers optimize a set of channel filters under some set of constraints. These techniques do well in narrowband, far-field applications and where the signal of interest generally has stationary statistics. However, traditional adaptive beamformers are not necessarily as well suited for use in speech applications where, for example, the signal of interest has a wide bandwidth, the signal of interest is non-stationary, interfering signals also have a wide bandwidth, interfering signals may be spatially distributed, or interfering signals are non-stationary. A particular adaptive array is the generalized sidelobe canceller (GSC). The GSC uses an adaptive array structure to measure a noise-only signal which is then canceled from the beamformer output. However, obtaining a noise measurement that is free from signal leakage, especially in reverberant environments, is generally where the difficulty lies in implementing a robust and effective GSC. An example of a beamformer with a GSC structure is described in L. J. Griffiths & C. W. Jim, An Alternative Approach to Linearly Constrained Adaptive Beamforming, in IEEE Transactions on Antennas and Propagation, 1982 pp. 27-34.

Referring again to FIG. 4, prior to reaching beamformer 406, signals 404 may pass signal processing elements 408 for pre-processing of the signals. The signal processing elements 408 may include, but are not limited to, filters such as high pass or low pass filters and the like. Beamformer 406 may be configured to process signals 404 in such a way as to obtain a single output signal ($Y_1(k)$) with an improved signal to noise ratio. Beamformer 406 may be a delay-and-sum beamformer (DSBF) in which delay compensation for the different microphones 402 is performed followed by summing the signals to obtain the output signal. Alternatively, beamformer 406 may use adaptive Wiener-filters, or beamformer 406 may have a GSC structure.

In some embodiments, microphone signals 404 may be sent to a noise detector 410. Prior to reaching the noise detector 410, the signals 404 may pass signal processing elements 408 for pre-processing of the signals. The signals 404 also may be sent to a noise reducer 412. Prior to reaching the noise reducer 412, the signals 404 may pass signal processing elements 408 for pre-processing of the signals.

In the noise detector 410, the microphone signals 404 may be processed in order to determine whether noise, particularly uncorrelated noise such as wind noise, is present. Depending on the result of the noise detection, the noise reduction or suppression performed by the noise reducer 412 may be activated. This is illustrated schematically by a switch 414. If no noise is detected, for example, for a predetermined time interval, the output signal $Y_1(k)$ of the beamformer 406 is not modified. If noise is detected, for example, for a predetermined time threshold, a noise reduction by way of signal modification is activated. Based on the beamformer 406 output signal $Y_1(k)$ and the microphone signals 404, a modified output signal, $Y_1^{mod}(k)_5$ may be generated.

In some embodiments, the processing and modifying of signal 404 also may be performed without requiring detection of noise. For example, the noise detector 410 may be omitted and the output signal $Y_1(k)$ of the beamformer 406 may always be passed to the noise reducer 412. Additional information regarding microphone arrays and various signal processing techniques may be found in U.S. Pat. No. 7,881,480, which is incorporated herein by reference in its entirety.

Generally, for a given microphone array the spectra of the microphone signals may be distinguishable in phase (depending on the direction of arrival of the acoustic signal), however there is generally little variation in amplitude regarding time-variant changes. Microphone tolerances in the signal magnitude spectra may still occur but these may be time-invariant. This is valid for both speech segments and noise only segments as long as the sources are not too close to the microphones. If one microphone is covered the magnitude of the spectrum may drop, particularly in high frequency regions. Accordingly, microphone identification process 10 may be configured to detect one or more covered microphones if the magnitude spectra of the microphone signals are compared to each other as is discussed in further detail hereinbelow.

In some embodiments, microphone identification process 10 may refer to processing of signals in the frequency sub-band domain. The time-domain microphone signals may be transformed to the frequency domain, e.g., by a short-time Fourier transformation. Thus, further signal processing may be applied in the frequency sub-band domain and some or all of the signal magnitudes included herein may be in the frequency sub-band domain and may be signal magnitude spectra.

Figure 6:
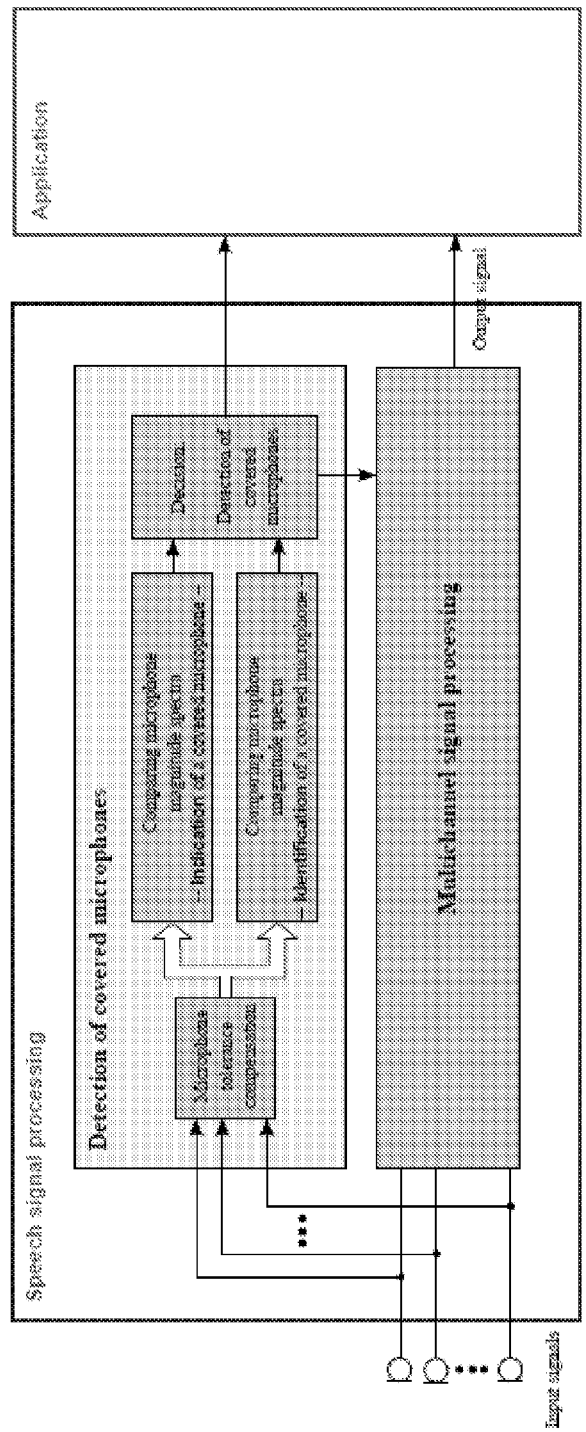
FIG. 6 is a diagrammatic view of a system configured to implement a microphone identification process in accordance with an embodiment of the present disclosure.

Referring now to FIGS. 5-6, in some embodiments microphone identification process 10 may include determining (502) a parameter of a first microphone and a second microphone, wherein the first microphone and the second microphone are associated with a computing device. In this particular example, the first and second microphones may correspond to uncovered microphone 202 and covered microphone 204 as shown in FIG. 2.

The phrase "parameter" as used herein may encompass its ordinary meaning and may refer to any parameter that may be associated with a particular microphone. For example, in some embodiments of the present disclosure, the magnitude spectrum of a microphone may be one example of a parameter.

In some embodiments, and as shown in FIG. 6, microphone identification process 10 may perform an adaptive compensation of microphone tolerances. In order to effectively exploit the mentioned characteristics of the microphone signal spectra it has to be guaranteed that the built-in variations within the microphone frequency responses across all M available microphones are within a particular threshold. To ensure this, microphone identification process 10 may perform an adaptive compensation of existing microphone tolerances. For example, slow adaptive equalizers may adjust each microphone spectrum to a reference spectrum. The first channel may be selected in a two-channel system or the median in a multi-channel system, etc, may be used as a reference. Accordingly, microphone identification process 10 may be configured to generate (504) a reference parameter based upon, at least in part, at least one of the parameter of first microphone 202 and the parameter of second microphone 204. Microphone identification process 10 may then adjust (506) a tolerance of at least one of first microphone 202 and second microphone 204, based upon, at least in part, the reference parameter. For the actual detection of covered microphones it is assumed that similar signal magnitude spectra across the available microphones are available.

In some embodiments, during the microphone tolerance compensation process, microphone identification process 10 may be configured to determine the time invariant and signal independent behavior while comparing appropriate input magnitude spectra $X_1(l,k)$ and $X_2(l,k)$ (where l is the time frame index and k the frequency sub-band index). Equation 1 included below provides an example of tolerance compensation. In this particular example, the one microphone spectrum $X_1(l,k)$ has to be adjusted to $X_2(l,k)$ and the result is depicted by $X'_1(l,k)$:

$$|X'_1(l,k)| = C(l-1,k) \cdot |X_1(l,k)|, \quad \text{EQUATION 1}$$

with $$C(l,k) = \alpha(l,k) \cdot C(l-1,k),$$

where $$\alpha(l,k) = \begin{cases} 1+\delta, & \text{if } |X'_1(l,k)| < |X_2(l,k)|, \\ 1-\delta, & \text{if } |X'_1(l,k)| > |X_2(l,k)|, \\ 1, & \text{else.} \end{cases}$$

with the small constant $\delta$.

In Equation 1, the coupling factor $C(l,k)$ has to change slowly (e.g. with $\alpha(l,k)$ very close to 1 and therewith with $\delta$ being very small) in order to compensate for the differences caused by the mismatch of the microphone frequency responses only.

In some embodiments, following the tolerance compensation process, microphone identification process 10 may be configured to receive (508), at first microphone 202, a first speech signal corresponding to an utterance of a speaker (e.g. user 50). Similarly, microphone identification process 10 may be configured to receive (510), at second microphone 204, a second speech signal corresponding to the utterance of the speaker (e.g. user 50). Each speech signal may have a magnitude and phase associated therewith.

Referring again to FIG. 6, in some embodiments, microphone identification process 10 may be configured to compare (512) at least one of the first speech signal magnitude and the second speech signal magnitude with a third speech signal magnitude. In this way, if a microphone (e.g. microphone 204) is covered in some way (e.g., by a loosely placed hand on the microphone as shown in FIG. 2) microphone 204 will show a different signal magnitude spectrum compared to the magnitude spectra of the other microphones (e.g. microphone 202).

In some embodiments, the third speech signal magnitude may be at least one of the first speech signal magnitude, second speech signal magnitude, a median of a plurality of speech magnitudes, and a reference speech signal magnitude. Accordingly, microphone identification process 10 may compare the magnitude of one microphone signal to that of another microphone. Additionally and/or alternatively, the magnitude of one microphone signal may be compared to the median of several other microphones. The reference speech signal magnitude may refer to any speech signal magnitude that is selected as a reference and that may be used as a tool for comparison purposes.

For example, and referring again to Equation 1, once the microphone tolerances are compensated microphone identification process 10 may be configured to compare two microphone signal spectra, a first channel signal spectrum $X'_1(l,k)$ and a reference signal spectrum $X'_3(l,k)$ where the potential microphone mismatch is compensated for each microphone.

In order to assess this characteristic, each channel signal magnitude spectrum may be compared to a reference spectrum. This difference may be evaluated using an appropriate frequency selective measure. With the time frame index l and the frequency sub-band index k such a measure $J_1(l,k)$, e.g., may be formulated for the first channel by:

$$J_1(l,k) = (|X'_1(l,k)| - |X'_3(l,k)|)^2 \quad \text{EQUATION 2}$$

where $X'_1(l,k)$ is the first microphone signal spectrum after the tolerance compensation compensating for differences within the frequency responses of the microphones. $X'_3(l,k)$ is the reference signal spectrum (e.g., the magnitude spectrum of one microphone signal ore the median of several other microhpones) again after the tolerance compensation. For example, high values for $J_1(l,k)$ may indicate that the currently observed spectrum has to be strongly adjusted to match the reference. A final fullband detector $J_1(l)$ may be determined by computation of the mean value of this measure across all frequency sub-bands:

$$J_1(l) = \frac{1}{K/2+1} \sum_{k=0}^{K/2} J_1(l,k) \quad \text{EQUATION 3}$$

$$= \frac{1}{K/2+1} \sum_{k=0}^{K/2} (|X'_1(l,k)| - |X'_3(l,k)|)^2$$

where K is the length of the Fourier transform used for the transformation to the frequency sub-band domain. Accordingly, microphone identification process 10 may be configured to detect (514) the existence of an obstructed microphone (e.g. microphone 204) based upon a comparison of this mean measure $J_1(l)$ with a threshold $\beta$:

$$\Theta(l) = \begin{cases} 1, & \text{if } J_1(l) \geq \beta \\ 0, & \text{else} \end{cases} \quad \text{EQUATION 4}$$

A one for the binary measure $\theta(l)$ indicates that a microphone is covered.

Figure 7:
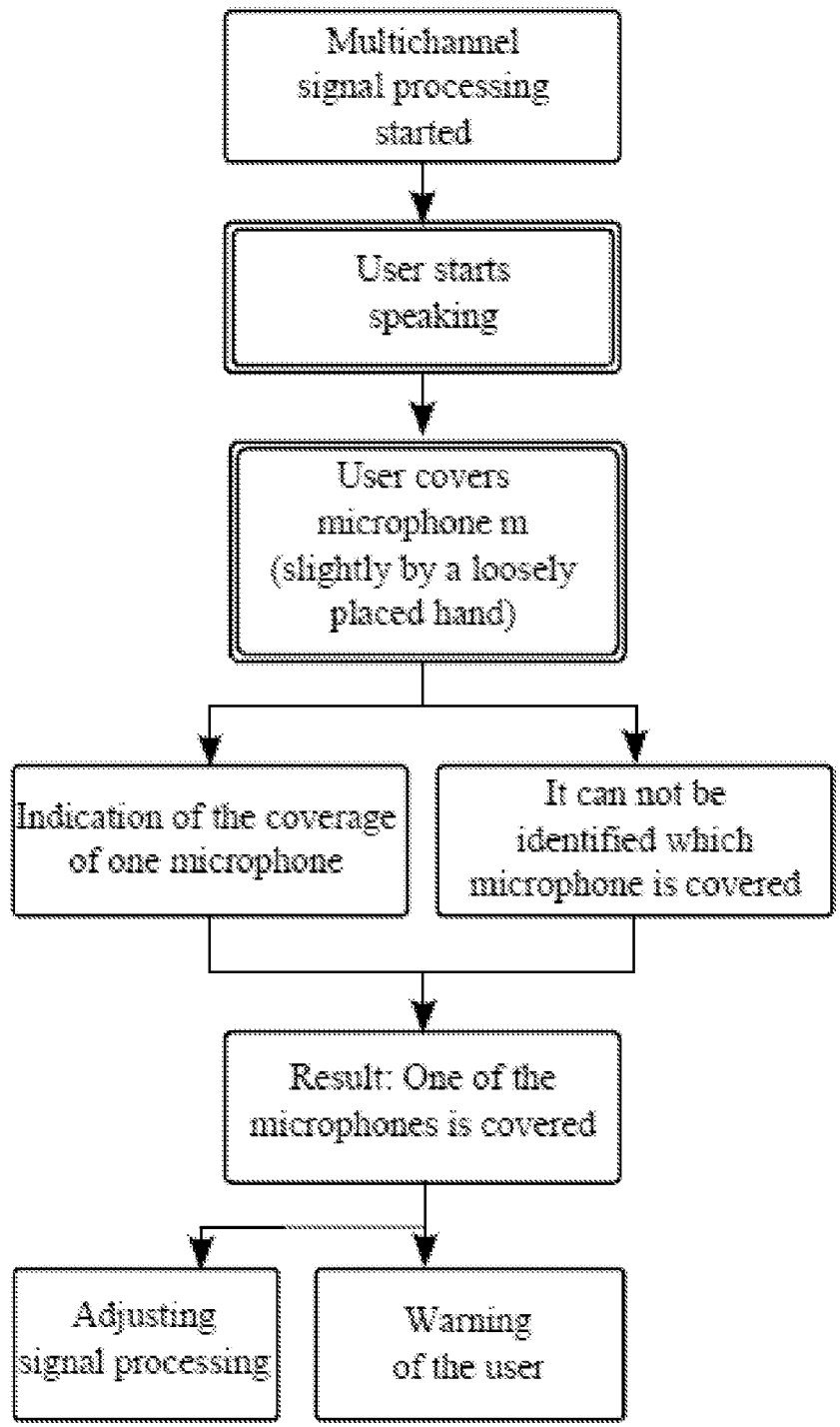
FIG. 7 is a flowchart of a microphone identification process in accordance with an embodiment of the present disclosure.
Figure 8:
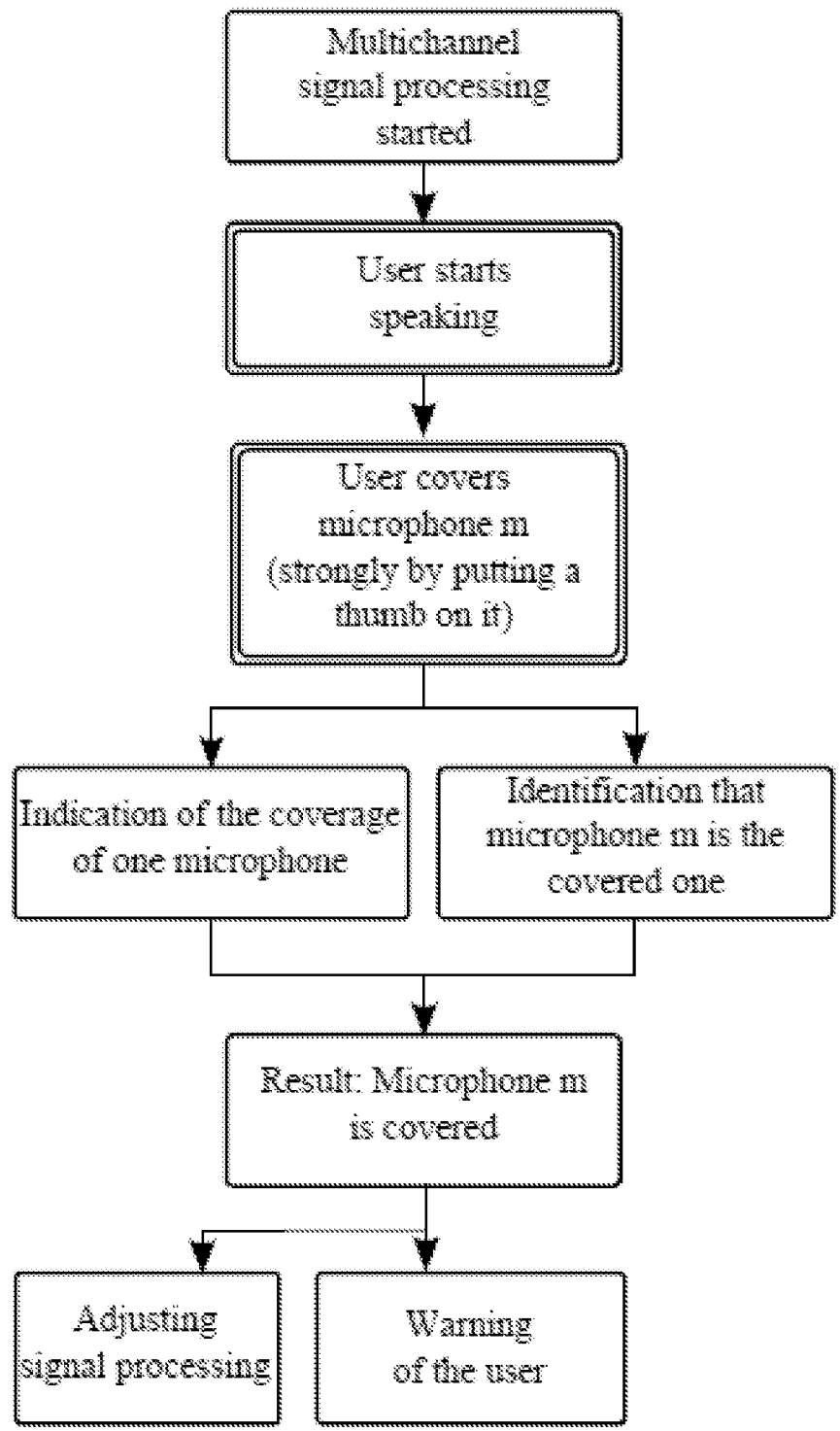
FIG. 8 is a flowchart of a microphone identification process in accordance with an embodiment of the present disclosure.

Referring now to FIG. 7, an embodiment depicting an example use case in accordance with microphone identification process 10 is provided. In this particular example, microphone identification process 10 may be configured to identify that there is an obstructed microphone as is discussed above. Additionally and/or alternatively, in order to determine the precise microphone that is obstructed the techniques outlined hereinbelow and the use case shown in FIG. 8 may be used.

In some embodiments, microphone identification process 10 may be configured to identify one or more low-pass characteristics associated with the obstructed microphone (e.g. microphone 204). Generally, a low-pass characteristic may occur in the signal magnitude spectrum if a microphone is strongly covered, e.g., by putting a thumb on the microphone aperture. Microphone identification process 10 may identify this low-pass characteristic by analyzing the differences in the microphone signal magnitude spectra as discussed above, however, in this example, process 10 may be configured to compare the mean of this measure for a low frequency range ($J_1^{low}(l)$) with the mean for a high frequency range ($J_1^{high}(l)$):

$$J_1^{low}(l) = \frac{1}{K_2 - K_1 + 1} \sum_{k=K_1}^{K_2} J_1(l, k) \quad \text{EQUATION 5}$$

and $$J_1^{high}(l) = \frac{1}{K_4 - K_3 + 1} \sum_{k=K_3}^{K_4} J_1(l, k)$$

with the sub-band indices $K_1<K_2<K_3<K_4$. Due to the expected low-pass characteristic if the considered microphone is covered the mean for the low frequency range may be very high in contrast to the mean for the high frequency range. Accordingly, microphone identification process 10 may be configured to identify that one or more microphones are obstructed and also to determine the particular microphones in the array that are obstructed. E.g., a binary detector $\theta_1(l)$ identifies a covered first microphone exploiting the occurring low-pass characteristic:

$$\Theta_1(l) = \begin{cases} 1, & \text{if } (J_1^{low}(l) \geq J_1^{high}(l)) \text{ and} \\ & (J_1^{low}(l) \geq \beta_{low}) \text{ and } (J_1^{high}(l) \leq \beta_{high}), \\ 0, & \text{else} \end{cases} \quad \text{EQUATION 6}$$

where $\beta_{low}$ and $\beta_{high}$ are appropriate thresholds.

In some embodiments, upon determining that one or more microphones are obstructed, microphone identification process 10 may be configured to utilize that determination in order to improve the performance of the microphone array. For example, microphone identification process 10 may be configured to deactivate a microphone that has been deemed obstructed. More specifically, if the index of a covered microphone has been detected explicitly in a beamforming system then this microphone may be ignored if more than two microphones are available.

Additionally and/or alternatively, and in response to detecting the obstructed microphone, microphone identification process 10 may be configured to deactivate a beamforming setting associated with the computing device. For example, if a microphone is covered the signal processing may disable or bypass the beamforming automatically. Microphone identification process 10 may then identify the microphone channel with the best SNR out of all available particular channel signals therefore ensuring that a good quality speech output signal is forwarded to the speech recognizer or the hands-free system.

In some embodiments, microphone identification process 10 may be configured to generate a feedback signal configured to indicate the presence of the obstructed microphone. For example, if a microphone is obstructed the operating system may inform the user that speech processing is disturbed due to microphone coverage, e.g., by visual feedback showing a warning on the screen and for instance a flashing microphone symbol. Additionally and/or alternatively, in a voice recognition system with a virtual assistant, the assistant may provide feedback acoustically via speech output that a microphone is covered (e.g., "Hello Kevin! Please ensure that you do not cover one of my microphones. I cannot hear you correctly!").

Figure 9:
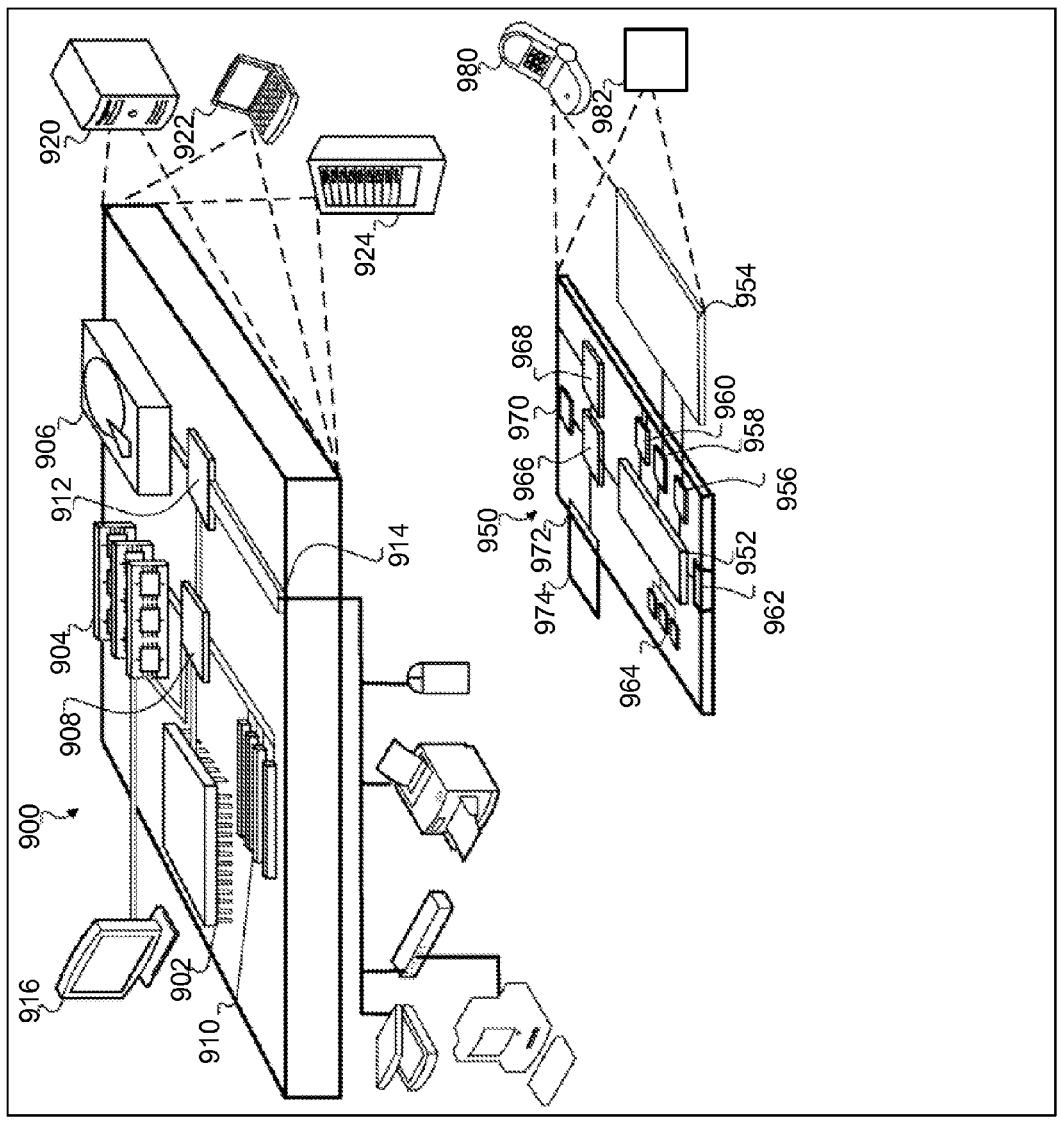
FIG. 9 shows an example of a computer device and a mobile computer device that can be used to implement embodiments of the present disclosure.

Referring now to FIG. 9, an example of a generic computer device 900 and a generic mobile computer device 950, which may be used with the techniques described here is provided. Computing device 900 is intended to represent various forms of digital computers, such as tablet computers, laptops, desktops, workstations, personal digital assistants, servers, blade servers, mainframes, and other appropriate computers. In some embodiments, computing device 950 can include various forms of mobile devices, such as personal digital assistants, cellular telephones, smartphones, and other similar computing devices. Computing device 950 and/or computing device 900 may also include other devices, such as televisions with one or more processors embedded therein or attached thereto. The components shown here, their connections and relationships, and their functions, are meant to be exemplary only, and are not meant to limit implementations of the inventions described and/or claimed in this document.

In some embodiments, computing device 900 may include processor 902, memory 904, a storage device 906, a high-speed interface 908 connecting to memory 904 and high-speed expansion ports 910, and a low speed interface 912 connecting to low speed bus 914 and storage device 906. Each of the components 902, 904, 906, 908, 910, and 912, may be interconnected using various busses, and may be mounted on a common motherboard or in other manners as appropriate. The processor 902 can process instructions for execution within the computing device 900, including instructions stored in the memory 904 or on the storage device 906 to display graphical information for a GUI on an external input/output device, such as display 916 coupled to high speed interface 908. In other implementations, multiple processors and/or multiple buses may be used, as appropriate, along with multiple memories and types of memory. Also, multiple computing devices 900 may be connected, with each device providing portions of the necessary operations (e.g., as a server bank, a group of blade servers, or a multiprocessor system).

Memory 904 may store information within the computing device 900. In one implementation, the memory 904 may be a volatile memory unit or units. In another implementation, the memory 904 may be a non-volatile memory unit or units. The memory 904 may also be another form of computer-readable medium, such as a magnetic or optical disk.

Storage device 906 may be capable of providing mass storage for the computing device 900. In one implementation, the storage device 906 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 904, the storage device 906, memory on processor 902, or a propagated signal.

High speed controller 908 may manage bandwidth-intensive operations for the computing device 900, while the low speed controller 912 may manage lower bandwidth-intensive operations. Such allocation of functions is exemplary only. In one implementation, the high-speed controller 908 may be coupled to memory 904, display 916 (e.g., through a graphics processor or accelerator), and to high-speed expansion ports 910, which may accept various expansion cards (not shown). In the implementation, low-speed controller 912 is coupled to storage device 906 and low-speed expansion port 914. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

Computing device 900 may be implemented in a number of different forms, as shown in the figure. For example, it may be implemented as a standard server 920, or multiple times in a group of such servers. It may also be implemented as part of a rack server system 924. In addition, it may be implemented in a personal computer such as a laptop computer 922. Alternatively, components from computing device 900 may be combined with other components in a mobile device (not shown), such as device 950. Each of such devices may contain one or more of computing device 900, 950, and an entire system may be made up of multiple computing devices 900, 950 communicating with each other.

Computing device 950 may include a processor 952, memory 964, an input/output device such as a display 954, a communication interface 966, and a transceiver 968, among other components. The device 950 may also be provided with a storage device, such as a microdrive or other device, to provide additional storage. Each of the components 950, 952, 964, 954, 966, and 968, may be interconnected using various buses, and several of the components may be mounted on a common motherboard or in other manners as appropriate.

Processor 952 may execute instructions within the computing device 950, including instructions stored in the memory 964. The processor may be implemented as a chipset of chips that include separate and multiple analog and digital processors. The processor may provide, for example, for coordination of the other components of the device 950, such as control of user interfaces, applications run by device 950, and wireless communication by device 950.

In some embodiments, processor 952 may communicate with a user through control interface 958 and display interface 956 coupled to a display 954. The display 954 may be, for example, a TFT LCD (Thin-Film-Transistor Liquid Crystal Display) or an OLED (Organic Light Emitting Diode) display, or other appropriate display technology. The display interface 956 may comprise appropriate circuitry for driving the display 954 to present graphical and other information to a user. The control interface 958 may receive commands from a user and convert them for submission to the processor 952. In addition, an external interface 962 may be provide in communication with processor 952, so as to enable near area communication of device 950 with other devices. External interface 962 may provide, for example, for wired communication in some implementations, or for wireless communication in other implementations, and multiple interfaces may also be used.

In some embodiments, memory 964 may store information within the computing device 950. The memory 964 can be implemented as one or more of a computer-readable medium or media, a volatile memory unit or units, or a non-volatile memory unit or units. Expansion memory 974 may also be provided and connected to device 950 through expansion interface 972, which may include, for example, a SIMM (Single In Line Memory Module) card interface. Such expansion memory 974 may provide extra storage space for device 950, or may also store applications or other information for device 950. Specifically, expansion memory 974 may include instructions to carry out or supplement the processes described above, and may include secure information also. Thus, for example, expansion memory 974 may be provide as a security module for device 950, and may be programmed with instructions that permit secure use of device 950. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product may contain instructions that, when executed, perform one or more methods, such as those described above. The information carrier may be a computer- or machine-readable medium, such as the memory 964, expansion memory 974, memory on processor 952, or a propagated signal that may be received, for example, over transceiver 968 or external interface 962.

Device 950 may communicate wirelessly through communication interface 966, which may include digital signal processing circuitry where necessary. Communication interface 966 may provide for communications under various modes or protocols, such as GSM voice calls, SMS, EMS, or MMS speech recognition, CDMA, TDMA, PDC, WCDMA, CDMA2000, or GPRS, among others. Such communication may occur, for example, through radio-frequency transceiver 968. In addition, short-range communication may occur, such as using a Bluetooth, WiFi, or other such transceiver (not shown). In addition, GPS (Global Positioning System) receiver module 970 may provide additional navigation- and location-related wireless data to device 950, which may be used as appropriate by applications running on device 950.

Device 950 may also communicate audibly using audio codec 960, which may receive spoken information from a user and convert it to usable digital information. Audio codec 960 may likewise generate audible sound for a user, such as through a speaker, e.g., in a handset of device 950. Such sound may include sound from voice telephone calls, may include recorded sound (e.g., voice messages, music files, etc.) and may also include sound generated by applications operating on device 950.

Computing device 950 may be implemented in a number of different forms, as shown in the figure. For example, it may be implemented as a cellular telephone 980. It may also be implemented as part of a smartphone 982, personal digital assistant, remote control, or other similar mobile device.

Figure 10:
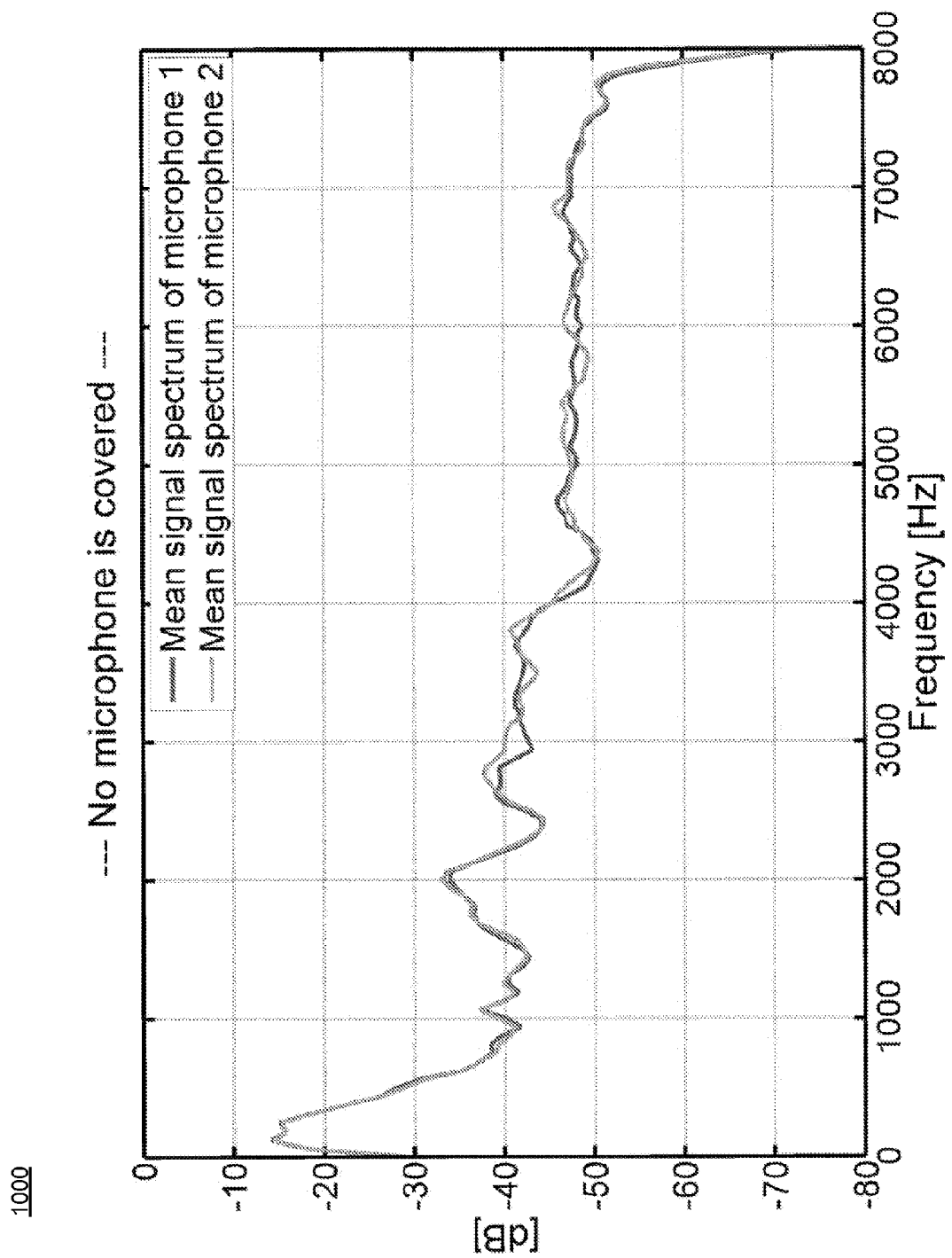
FIG. 10 shows a diagram depicting a mean signal spectrum of an uncovered microphone in accordance with an embodiment of the present disclosure.
Figure 11:
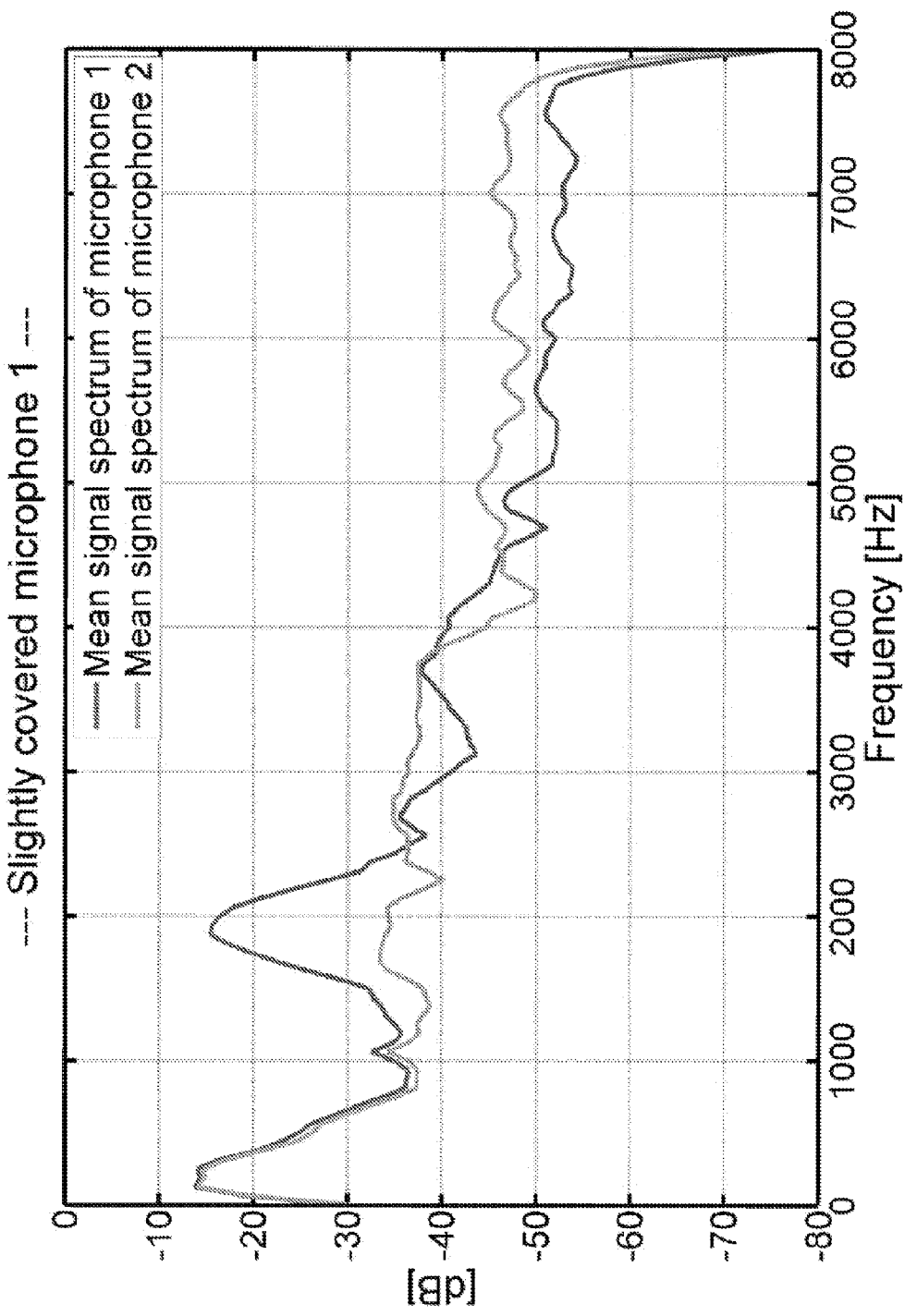
FIG. 11 shows a diagram depicting a mean signal spectrum of a partially covered microphone in accordance with an embodiment of the present disclosure.
Figure 12:
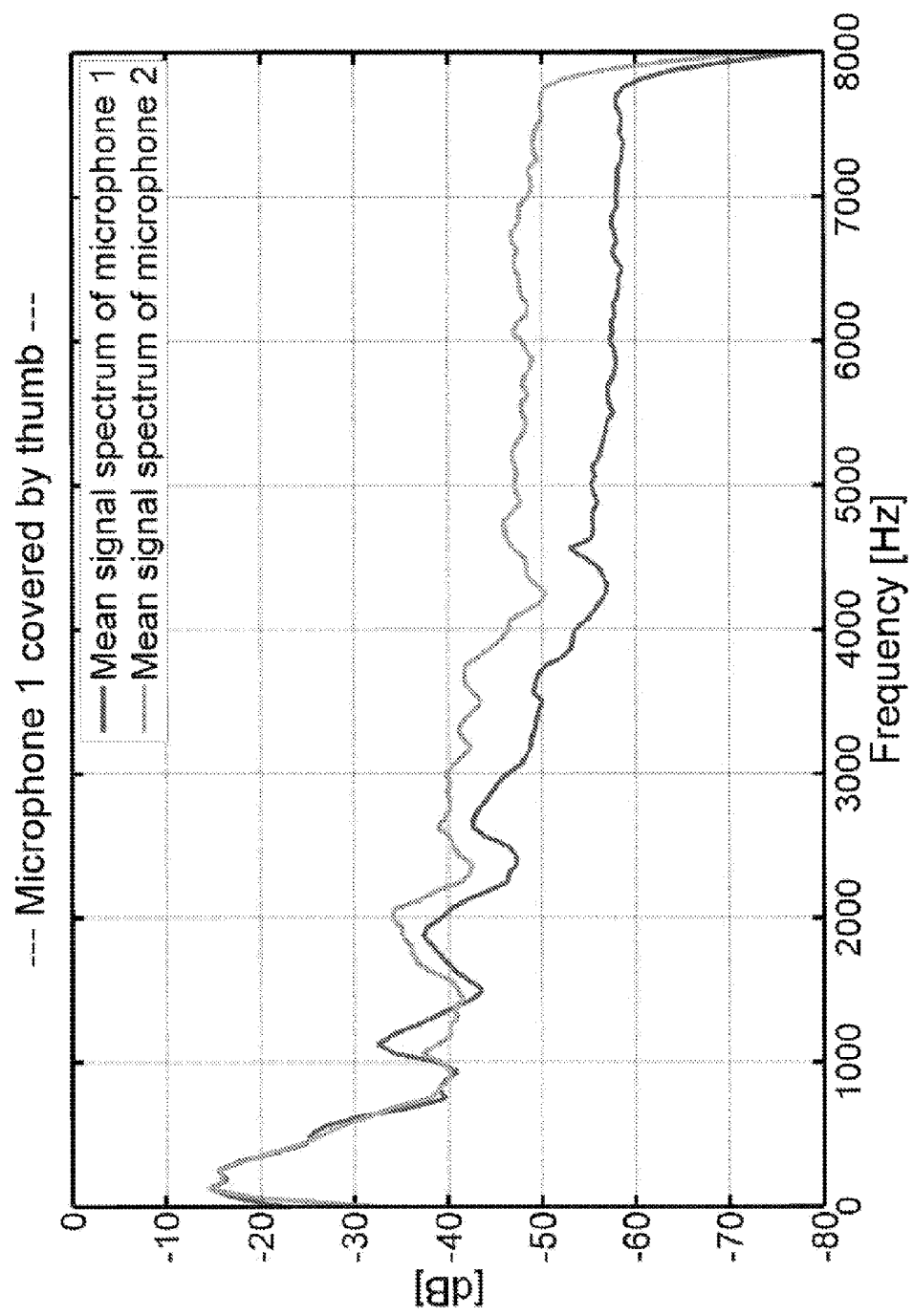
FIG. 12 shows a diagram depicting a mean signal spectrum of a significantly covered microphone in accordance with an embodiment of the present disclosure.

Referring now to FIGS. 10-12, diagrams depicting the mean signal spectrum of two microphones are shown. FIG. 10 depicts the mean signal spectrum where no microphone is covered. FIG. 11 depicts the mean signal spectrum where a microphone is slightly covered and FIG. 12 depicts the mean signal spectrum where a microphone is significantly covered. These diagrams are provided merely by way of example and are not intended to limit the present disclosure in any way.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

As will be appreciated by one skilled in the art, the present disclosure may be embodied as a method, system, or computer program product. Accordingly, the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present disclosure may take the form of a computer program product on a computer-usable storage medium having computer-usable program code embodied in the medium.

Any suitable computer usable or computer readable medium may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device.

Computer program code for carrying out operations of the present disclosure may be written in an object oriented programming language such as Java, Smalltalk, C++ or the like. However, the computer program code for carrying out operations of the present disclosure may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

The present disclosure is described below with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here may be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system may include clients and servers. A client and server are generally remote from each other and typically interact through a communication network. The relationship of client and server arises by virtue of computer programs running on the respective computers and having a client-server relationship to each other.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

Having thus described the disclosure of the present application in detail and by reference to embodiments thereof, it will be apparent that modifications and variations are possible without departing from the scope of the disclosure defined in the appended claims.

What is claimed is:

1. A computer-implemented method comprising:
   determining a parameter of a first microphone and a parameter of a second microphone, wherein the first microphone and the second microphone are associated with a computing device and wherein the parameter of the first microphone and the parameter of the second microphone is a magnitude spectrum parameter;
   generating a reference parameter based upon, at least in part, at least one of the parameter of the first microphone and the parameter of the second microphone;
   adjusting a tolerance of at least one of the first microphone and the second microphone, based upon, at least in part, the reference parameter;
   receiving, at the first microphone, a first speech signal corresponding to an utterance of a speaker, the first speech signal having a first speech signal magnitude;
   receiving, at the second microphone, a second speech signal corresponding to the utterance of the speaker, the second speech signal having a second speech signal magnitude;
   comparing at least one of the first speech signal magnitude and the second speech signal magnitude with a third speech signal magnitude, wherein comparing at least one of the first speech signal magnitude and the second speech signal magnitude with the third speech signal magnitude occurs after adjusting the tolerance of at least one of the first microphone and the second microphone;
   detecting an obstructed microphone based upon, at least in part, comparing at least one of the first speech signal magnitude and the second speech signal magnitude with the third speech signal magnitude; and
   in response to detecting the obstructed microphone, deactivating a beamforming setting associated with the computing device.

2. The method of claim 1, wherein detecting the obstructed microphone includes identifying at least one low-pass characteristic associated with the obstructed microphone.

3. The method of claim 1, further comprising:
   deactivating the obstructed microphone.

4. The method of claim 1, further comprising:
identifying a microphone channel based upon, at least in part, a signal-to-noise ratio analysis.

5. The method of claim 1 further comprising:
generating, at the computing device, a feedback signal configured to indicate a presence of the obstructed microphone.

6. The method of claim 1, wherein the third speech signal magnitude is at least one of the first speech signal magnitude, second speech signal magnitude, a median of a plurality of speech magnitudes, and a reference speech signal magnitude.

7. A system comprising:
a computing device including one or more processors configured to determine a parameter of a first microphone and a parameter of a second microphone, wherein the first microphone and the second microphone are associated with the computing device and wherein the parameter of the first microphone and the parameter of the second microphone is a magnitude spectrum parameter, the one or more processors further configured to generate a reference parameter based upon, at least in part, at least one of the parameter of the first microphone and the parameter of the second microphone, the one or more processors further configured to adjust a tolerance of at least one of the first microphone and the second microphone, based upon, at least in part, the reference parameter, the one or more processors further configured to receive, at the first microphone, a first speech signal corresponding to an utterance of a speaker, the first speech signal having a first speech signal magnitude, the one or more processors further configured to receive, at the second microphone, a second speech signal corresponding to the utterance of the speaker, the second speech signal having a second speech signal magnitude, the one or more processors further configured to compare at least one of the first speech signal magnitude and the second speech signal magnitude with a third speech signal magnitude, wherein comparing at least one of the first speech signal magnitude and the second speech signal magnitude with the third speech signal magnitude occurs after adjusting the tolerance of at least one of the first microphone and the second microphone, the one or more processors further configured to detect an obstructed microphone based upon, at least in part, comparing at least one of the first speech signal magnitude and the second speech signal magnitude with the third speech signal magnitude, wherein in response to detecting the obstructed microphone, the one or more processors are further configured to deactivate a beamforming setting associated with the computing device.

8. The system of claim 7, wherein detecting the obstructed microphone includes identifying at least one low-pass characteristic associated with the obstructed microphone.

9. The system of claim 7, wherein the one or more processors are further configured to deactivate the obstructed microphone.

10. The system of claim 7, the one or more processors are further configured to identify a microphone channel based upon, at least in part, a signal-to-noise ratio analysis.

11. The system of claim 7, the one or more processors are further configured to generate at the computing device, a feedback signal configured to indicate a presence of the obstructed microphone.

12. The system of claim 11, wherein the third speech signal magnitude is at least one of the first speech signal magnitude, second speech signal magnitude, a median of a plurality of speech magnitudes, and a reference speech signal magnitude.

13. A computer program product including a non-transitory computer readable medium having stored thereon instructions, which when executed result in one or more operations, the operations comprising:
determining a parameter of a first microphone and a parameter of a second microphone, wherein the first microphone and the second microphone are associated with a computing device and wherein the parameter of the first microphone and the parameter of the second microphone is a magnitude spectrum parameter;
generating a reference parameter based upon, at least in part, at least one of the parameter of the first microphone and the parameter of the second microphone;
adjusting a tolerance of at least one of the first microphone and the second microphone, based upon, at least in part, the reference parameter;
receiving, at the first microphone, a first speech signal corresponding to an utterance of a speaker, the first speech signal having a first speech signal magnitude;
receiving, at the second microphone, a second speech signal corresponding to the utterance of the speaker, the second speech signal having a second speech signal magnitude;
comparing at least one of the first speech signal magnitude and the second speech signal magnitude with a third speech signal magnitude, wherein comparing at least one of the first speech signal magnitude and the second speech signal magnitude with the third speech signal magnitude occurs after adjusting the tolerance of at least one of the first microphone and the second microphone;
detecting an obstructed microphone based upon, at least in part, comparing at least one of the first speech signal magnitude and the second speech signal magnitude with the third speech signal magnitude; and
in response to detecting the obstructed microphone, deactivating a beamforming setting associated with the computing device.

14. The computer program product of claim 13, wherein detecting the obstructed microphone includes identifying at least one low-pass characteristic associated with the obstructed microphone.

15. The computer program product of claim 13, wherein operations further comprise:
deactivating the obstructed microphone.

16. The computer program product of claim 13, wherein operations further comprise:
identifying a microphone channel based upon, at least in part, a signal-to-noise ratio analysis.

17. The computer program product of claim 13, wherein the third speech signal magnitude is at least one of the first speech signal magnitude, second speech signal magnitude, a median of a plurality of speech magnitudes, and a reference speech signal magnitude.

* * * * *